Dec. 21, 1943.     P. G. HOLT     2,337,045
AVERAGING DEVICE FOR MEASURING INSTRUMENTS
Filed Nov. 18, 1942
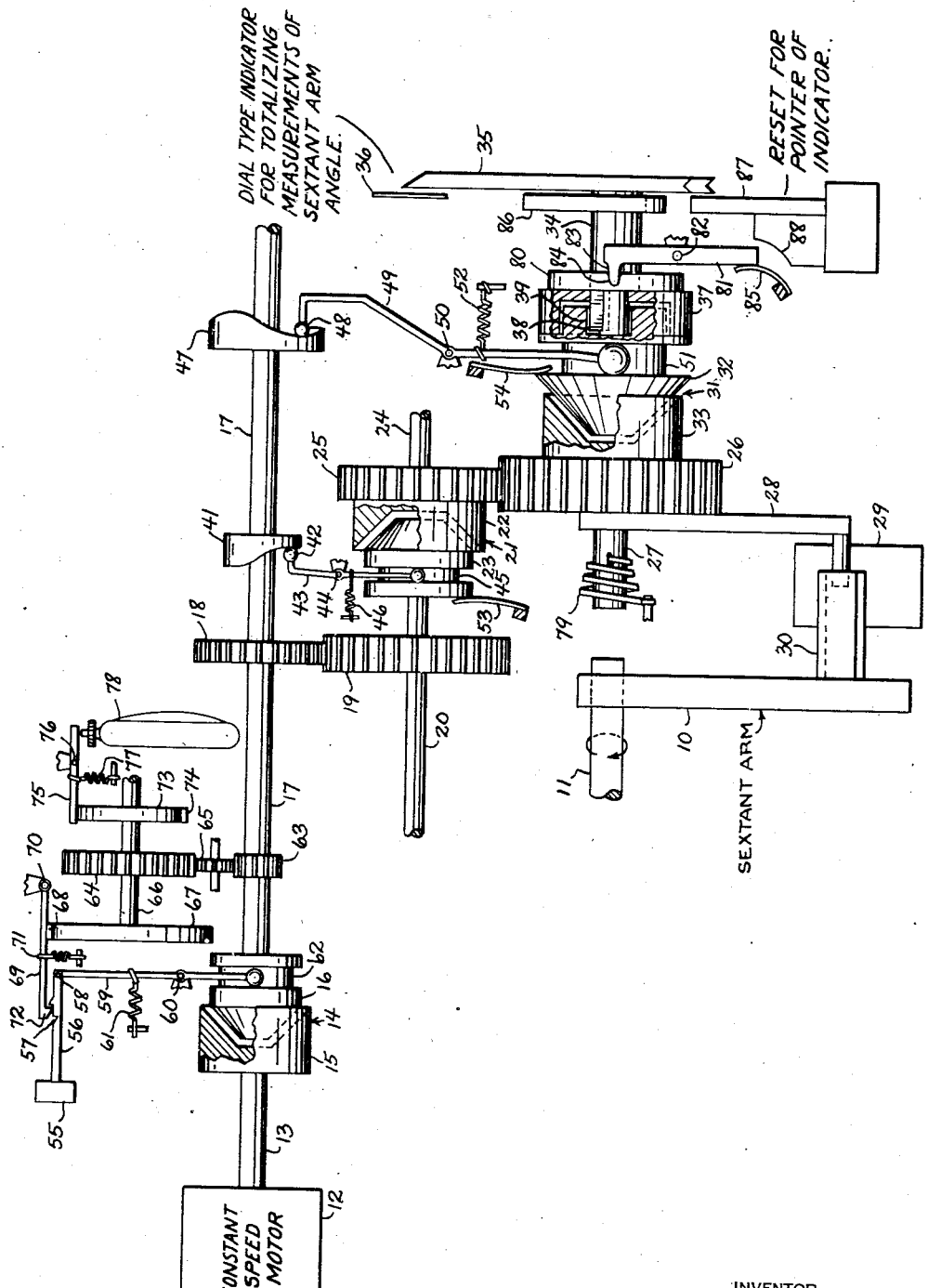
INVENTOR
Pliny G. Holt
BY
ATTORNEY Patented Dec. 21, 1943

2,337,045

UNITED STATES PATENT OFFICE 2,337,045

AVERAGING DEVICE FOR MEASURING INSTRUMENTS

Pliny G. Holt, United States Navy

Application November 18, 1942, Serial No. 466,089

11 Claims. (Cl. 33—70)

(Granted under the act of March 3, 1883, as amended April 30, 1928; 370 O. G. 757)

My invention relates in general to averaging devices, and in particular to a device for obtaining the average reading of a measuring instrument over a predetermined period of time.

The particular object of my invention is to provide a device which will automatically take a predetermined number of separate readings of the measuring instrument and automatically totalize such readings to render an average value for such readings.

Another object is to provide means for obtaining the mid-time of the period over which the predetermined number of readings have been taken.

While the principles of my invention may be adapted to measuring instruments in general, it has particular value when applied to an octant or sextant or other equivalent angle measuring instrument utilized to measure the angle between a celestial body and the horizon.

The following description accordingly concerns the application of my invention to this type of instrument, such instrument being well known in the art and having a pivotally mounted arm which is moved by an observer from a zero angle reference position to measure the angle between the celestial body and the horizon.

I am aware that averaging devices for this type of instrument are already known in the art, but it is believed that an averaging device made in accordance with the principles of my invention offers advantages not obtainable by any of the prior art structures.

For example an averaging device made in accordance with my invention when applied to an instrument for measuring angles between a celestial body and the horizon enables a complete set of observations to be made by one person alone. This desirable result is obtained for the reason that no initial instrument reading needs to be taken of the angle between the celestial body and the horizon nor of the time when the angle averaging device is placed in operation.

In the accompanying drawing, the single figure of which clearly shows the essential features of my invention in diagrammatic form, the apparatus for taking the predetermined number of readings of the angle measured by a sextant arm 10 pivotally mounted on shaft 11 comprises a constant speed drive 12 of any suitable type, such as, for example, a spring loaded escapement system (the details of which form no part of my invention and accordingly have been illustrated in "block" form only), which is adapted to rotate a shaft 13.

Shaft 13 is coupled by a clutch mechanism 14 consisting of clutching members 15 and 16 to rotate a shaft 17 for a predetermined number of revolutions, each at a uniform time rate, as will hereinafter be explained in detail. A gear 18 rotatable with shaft 17 meshes with a gear 19 to rotate a stub shaft 20 suitably journalled. A second clutch mechanism 21 consisting of clutching members 22 and 23 is provided for coupling shaft 20 with a second stub shaft 24 also suitably journalled and carrying a gear 25. Gear meshes with gear 26 which is secured on another suitably journalled stub shaft 27 which is preferably mounted co-axially with shaft 11. An arm 28 is rigidly secured to shaft 27 and oscillates between a stop member 29 which is aligned with the zero reference angle position of the sextant arm 10 and a lateral projection 30 carried by arm 10.

A third clutching mechanism 31 comprising clutch members 32 and 33 is provided for connecting shaft 27 to a shaft 34, the latter having a pointer 35 rotatable over a dial 36 calibrated to give the measured angle.

Shaft 34 and a disc member 37 secured thereto are suitably journalled in bearings not illustrated and are fixed against axial movement. The left end of shaft 34 is reduced in diameter and provided with a keyed portion 38 which fits within a key slotted portion 39 which is formed as part of the clutching member 32.

A cam 41 which rotates with shaft 17 is adapted to operate a cam follower 42, the latter being secured to one end of a lever 43 pivotally mounted at 44. The other end of lever 43 is adapted to ride in an annular groove 45 which is formed as part of clutch member 23. Lever 43 is biased by spring 46 to disengage clutch member 22 from clutch member 23 of clutch mechanism 21 when cam follower 42 occupies the position shown in the drawing.

Another cam 47 is provided to rotate with shaft 17 and this cam is adapted to operate a cam follower 48 which is secured to one end of a lever 49 which is pivotally mounted at 50. The other enlarged end of lever 49 is adapted to ride in an annular recess 51 which is formed as a part of clutch member 32, and a spring 52 is provided to maintain clutching members 32 and 33 of the clutch mechanism 31 in a disengaged position when cam 47 is in the position shown on the drawing.

As will be evident from the drawing, when cam 41 rotates with shaft 17 cam follower 42 will be moved to the left, effecting counterclockwise motion of lever 43 and thereby causing clutch member 23 to become engaged with clutch member 22. A cantilever spring 53 may be provided to urge clutch member 23 into engagement with clutch member 22 as lever 43 is so rotated.

In a similar manner as cam 47 rotates with shaft 17, cam follower 48 will move to the right, effecting clockwise motion of lever 49 and hence operate to effect engagement between clutch members 32 and 33 of clutch mechanism 31. Another cantilever spring 54 may be provided to urge clutch member 32 into engagement with clutch member 33 when lever 49 is so rotated.

The timing mechanism referred to above consists of a push button 55 secured to a rod member 56 having a notched portion 57. Rod 56 is pivotally connected at 58 to a lever 59 which is pivotally mounted at 60, and a spring 61 may be provided to urge lever 59 for counterclockwise rotation. The lower enlarged end of the pivoted lever 59 rides in a recess 62 which may be formed as a part of clutch member 16.

As push button 55 is moved to the right, such action will effect clockwise rotation of lever 59 and cause clutch member 16 to become engaged with clutch member 15. This clutching action couples shaft 17 to shaft 13, the latter being driven by the motor mechanism 12, as previously explained. A gear 63 rotating with shaft 17 is adapted to rotate a gear 64 through an idler gear 65, the gear 64 being mounted on a stub shaft 66 suitably journalled.

A timing disc 67 rotatable with shaft 66 is provided for maintaining clutch members 15 and 16 of the clutch mechanism 14 in engagement with each other for a predetermined length of time, such time being the time necessary for the disc 67 to make one complete revolution. This is achieved by providing a raised portion 68 at one point on disc 67. When the raised portion 68 occupies the position shown in the drawing, a lever 69, which is pivotally mounted at 70, is raised against an opposed biasing action furnished by a spring 71. Lever 69 carries a pawl 72 at its free end and this pawl is adapted to fit within notch 57 provided in rod 56. As the time cycle is started by moving push button 55 and rod 56 to the right, pawl 72 rides along the surface of rod 56 and when it reaches notch 57 pawl 72 will move down into the notch 57 under the influence of spring member 71 locking in clutch members 15 and 16 and starting rotation of shaft 17. However, when disc 67 completes one revolution, the raised portion 68 thereon will operate to move lever 69 upwardly and hence disengage pawl 72 from notch 57, which allows spring 61 to pull lever 59 in a counterclockwise direction and disengage clutch member 16 from clutch member 15 to stop shaft 17.

To automatically record the mid-time of the predetermined period that shafts 13 and 17 are coupled together, another disc 73 is provided which rotates with shaft 66. Disc 73 is similar to disc 67 and includes a raised portion 74 which is disposed 180° out of phase with the raised portion 68 on disc 67.

A lever 75 pivoted at 76 and biased in a counterclockwise sense of rotation by spring 77 is provided and functions when lever 75 is rotated clockwise by the raised portion 74 of disc 73 to automatically stop a watch 78 which may be suitably supported in a frame member not illustrated. Since the timing mechanism will function for one complete revolution of the disc 67, and the raised portion 68 thereon is disposed 180° out of phase with the raised portion 74 on disc 73, it will be evident that watch 78 will be stopped at the midpoint of the time for which the timing mechanism operates.

*Operation*

My device operates in the following manner: The sextant is raised to sighting position by the observer and the observer then rotates the sextant arm 10 which adjusts the optical system in the sextant until the celestial body has been brought into coincidence with the horizon. He then starts the motor mechanism 12 and shaft 13 to rotate and presses upon push button 55 which functions to cause clutch members 15 and 16 of clutch mechanism 14 to become engaged and locked in engagement through the latching mechanism provided by the notch portion 57 and pawl 72.

Shaft 17 will then begin to turn at a fixed time rate per revolution, rotating gears 63, 18 and 19, and cams 41 and 47, as previously described. Cam 47 is set somewhat in advance of cam 41 so that as cam 47 rotates, cam follower 48 will move to the right and effect engagement between clutch members 33 and 32 of clutch mechanism 31, as previously described. Such action will cause shaft 34 and hence pointer 35 to rotate with rotation of gear 26, the latter being set into rotation shortly after clutch mechanism 31 has been actuated through operation of the cam follower 42 on cam 41 which initiates rotation of gear 25 through the clutch mechanism 21, as previously explained.

Arm 28 being secured rigidly to shaft 27 accordingly rotates in step with pointer 35 until the former strikes against the laterally extending projection 30 carried by the arm 10. Since arm 28 and gear 26 are secured rigidly to shaft 27, gear 26 will also be stopped when arm 28 is stopped, thereby stopping rotation of gear 25 and causing the driven clutch member 22 to slip with respect to the driving clutch member 23 for so long a time as the cam follower 42 remains upon the high portion of cam 41.

As cam follower 42 moves downwardly off the high portion of cam 41, spring 46 will now function to move clutch member 23 out of engagement with clutch member 22. Likewise, when cam follower 48 rides down from the high portion of cam 47, clutch members 32 and 33 will become disengaged by the biasing action of the spring 52. Gears 25 and 26 are then free to rotate and a torsion spring 79 functions to rotate the arm 28 back against its stop member 29.

This order of events is repeated for each revolution of shaft 17 and cams 41 and 47 and thereby causes pointer 35 to be moved step by step with each oscillation of lever 28.

To hold pointer 35 in the position to which it is moved upon each revolution of cams 41 and 47, a friction disc 80 is loosely mounted on shaft 34 and this disc is maintained in frictional engagement with an end face of disc 37 at all times by means of a lever 81 pivotally mounted at 82. One end of lever 81 is provided with a protuberance 83 which fits within a complementary recess 84 in the disc 80, a cantilever spring 85 being provided to urge disc 80 into frictional engagement with disc 37. Thus when clutch members 32 and 33 are engaged, the disc 37 and pointer 35 are turned against the opposing friction furnished by disc 80 but when clutch members 32 and 33 are disengaged, the disc 37 and pointer 35 are stopped immediately.

As previously explained, shaft 17 will continue to rotate until disc 67 has made one complete revolution, at which time pawl 72 will be disengaged from the notched portion 57, thereby permitting spring 61 to move lever 59 to disengage clutch members 15 and 16, thereby stopping the shaft 17.

In order that the pointer 35 may read the average of all of the predetermined number of measurements made by the arm 28, the dial 36 is so calibrated that the angle measured by each stepped movement of the pointer 35 is equal to the reciprocal of the predetermined number of measurements which are made. In other words, for example, if the timing mechanism is so set that shaft 17 and cams 41 and 47 will make fifteen complete revolutions, which means that arm 28 will move fifteen times between its stop member 29 and the projection 30 carried by sextant arm 19, then dial 36 will be so calibrated that pointer 35 will indicate thereon only one-fifteenth of any angle measured by arm 28.

All during the operation of the timing mechanism, the observer, of course, will move sextant arm 19 continuously with the relative movement between the celestial body and horizon so as to keep the celestial body and the horizon in coincidence. Thus, when the timing mechanism has run its course, the observer may look upon the dial 36 and read off the average value of the angles measured and may also obtain from the watch 79, the mid-time of the period during which the predetermined number of measurements were made by the mechanism.

To reset the pointer to a zero angle position on dial 36, any suitable mechanism such as a cardiod cam 86 fixed to shaft 34 and a cam plunger 87 may be utilized. The cam plunger 87 may be provided with a cam surface 88 which rides upon and turns lever 81 in a clockwise rotation to release friction disc 89 from disc 37 during the resetting operation.

In conclusion, it will be evident that I have provided an averaging device which is a decided advance in the art and which does not require any initial reading to be taken of the angle between the celestial body and the horizon or the time when the angle averaging device is placed in operation.

It will also be evident that the present embodiment is illustrative of only one form of the invention and that many changes may be made without departing from the scope of the invention as defined in the appended claims.

The invention described herein may be manufactured and used by or for the Government of the United States of America for governmental purposes without the payment of any royalties thereon or therefor.

Having thus set forth and disclosed the nature of this invention, what is claimed is:

1. In a device for averaging a plurality of measurements of an instrument over a predetermined period of time, said instrument having means displaceable in accordance with each said measurements of the instrument, the combination comprising measuring means operable over said period of time and controlled as to degree of movement by said displaceable means for automatically taking a predetermined number of uniformly time spaced measurements of said instrument displaceable means, and totalizer means operable progressively by and in accordance with each operation of said measuring means for totalizing said measurements, said totalizer means being calibrated to indicate a single average measurement of said instrument displaceable means over said period of time.

2. In a device for averaging a plurality of measurements of an instrument over a predetermined period of time, said instrument having means displaceable in accordance with said measurement of the instrument, the combination comprising timing means, measuring means controlled as to degree of movement by said displaceable means and including said timing means for automatically taking a predetermined number of uniformly time spaced measurements of said instrument displaceable means over said period of time, totalizer means operable progressively by and in accordance with each operation of said measuring means for totalizing said measurements, said totalizer means being calibrated to indicate a single average measurement of said instrument displaceable means over said period of time, and means operable by said timing means to register the time at the midpoint of said period of time.

3. In a device for averaging a plurality of measurements of an instrument over a predetermined period of time, said instrument having means displaceable in accordance with each said measurement of the instrument, the combination comprising an oscillatory member, means for automatically obtaining a predetermined number of oscillations of said oscillatory member between a stop position and the displaceable means of said instrument, a totalizer carried by said device for averaging said plurality of instrument measurements, and means coupling said totalizer to and for operation step by step with each oscillation of said oscillatory member, said totalizer being calibrated to indicate a single average measurement of said instrument upon the completion of the predetermined number of step by step movements thereof.

4. In a device such as a sextant for obtaining the mean altitude of a celestial body over a period of time, said sextant including means adapted to be continuously adjusted during said time period for continuously measuring the angle between said celestial body and the horizon, the combination comprising measuring means controlled as to degree of movement by said adjusted means for automatically taking a predetermined number of uniformly time spaced measurements of the angle measured by said sextant adjusting means, and angle totalizer means operable progressively by and in accordance with each such operation of said measuring means, said totalizer means being calibrated to indicate a single average measurement of all of said angles measured.

5. In a device such as a sextant for obtaining the mean altitude of a celestial body over a period of time, said sextant including means adapted to be continuously adjusted during said time period for continuously measuring the angle between said celestial body and the horizon, the combination comprising measuring means controlled as to degree of movement by said adjusted means for automatically taking a predetermined number of uniformly time spaced measurements of the angle measured by sextant adjusting means, angle totalizer means operable progressively by and in accordance with each such operation of said measuring means, said totalizer means being calibrated to indicate a single average measurement of all of said angles measured, and means operable to register the time when one-half of the predetermined number of measurements of said angle have been taken.

6. In a device such as a sextant for obtaining the mean altitude of a celestial body over a period of time, said sextant including means adapted to be continuously adjusted during said time period for continuously measuring the angle between said celestial body and the horizon, the combination comprising a drive shaft, means including constant speed motor means and timing means for rotating said drive shaft a predetermined number of revolutions at a fixed time rate per revolution, a driven shaft, a lever mounted on and rotatable with said driven shaft, means for coupling said driven shaft to said drive shaft to oscillate said lever once between a stop position therefor and said sextant adjusting means for each revolution of said drive shaft, angle totalizer means, and means coupling said totalizer means to and for operation step by step with each oscillation of said lever, said totalizer means being calibrated to indicate a single average measurement of said sextant upon the completion of the predetermined number of step by step movements thereof.

7. The combination in claim 6 and including means operable by said timing means for registering the time when one-half of the predetermined number of revolutions of said drive shaft have been completed.

8. In a device such as a sextant for obtaining the mean altitude of a celestial body over a period of time, said sextant including an angle measuring arm adapted to be moved continuously during said time period for continuously measuring the angle between said celestial body and the horizon, the combination comprising a drive shaft, means including constant speed motor means and timing means for rotating said drive shaft a predetermined number of revolutions at a fixed time rate per revolution, a driven shaft, a lever mounted on and rotatable with said driven shaft, means for coupling said driven shaft to said drive shaft to oscillate said lever once between a stop position therefor and said sextant arm for each revolution of said drive shaft, angle totalizer means, and means coupling said totalizer means to and for operation step by step with each oscillation of said lever, said totalizer means being calibrated to indicate a single average measurement of said sextant upon the completion of the predetermined number of step by step movements thereof.

9. In a device such as a sextant for obtaining the mean altitude of a celestial body over a period of time, said sextant including an angle measuring arm adapted to be moved continuously during said time period for continuously measuring the angle between said celestial body and the horizon, the combination comprising a drive shaft, means including motor means and timing means for rotating said drive shaft a predetermined number of revolutions at a fixed time rate per revolution, a driven shaft, a lever mounted on and rotatable with said driven shaft, a first cam rotatable with said drive shaft, means including a follower for said first cam and clutch means for coupling said driven shaft with said drive shaft to oscillate said lever once between a stop position therefor and said sextant arm for each revolution of said drive shaft, angle totalizer means, said totalizer means comprising a scale and a pointer operatively connected to rotate progressively with each oscillation of said lever over said scale, said scale being so calibrated that said pointer in moving thereover will indicate for each oscillation of said lever actual angular movement of said lever divided by the number of oscillations thereof, and means operable by said timing means for registering the time when one-half the predetermined number of revolutions of said drive shaft have been made.

10. In a device such as a sextant for obtaining the mean altitude of a celestial body over a period of time, said sextant including an angle measuring arm adapted to be moved continuously during said time period for continuously measuring the angle between said celestial body and the horizon, the combination comprising a drive shaft, constant speed motor means, first clutch means for coupling said motor means to rotate said drive shaft at a fixed time rate per revolution, timing means operable to disengage said first clutch means upon completion of a predetermined number of revolutions of said driven shaft, a driven shaft, a lever mounted upon and rotatable with said driven shaft, a first cam rotatable with said drive shaft, means including a follower for said first cam and clutch means for coupling said driven shaft with said drive shaft to oscillate said lever once between a stop position therefor and said sextant arm for each revolution of said drive shaft, angle totalizer means including a scale and a pointer operable over said scale, the latter being so calibrated that said pointer in moving thereover will indicate for each oscillation of said lever actual angular movement of said lever divided by the number of oscillations thereof, a second cam rotatable with said drive shaft, and means including a follower for said second cam and clutch means for coupling said pointer to be moved progressively with each oscillation of said lever.

11. In a device such as a sextant for obtaining the mean altitude of a celestial body over a period of time, said sextant including an angle measuring arm adapted to be moved continuously during said time period for continuously measuring the angle between said celestial body and the horizon, the combination comprising a drive shaft, constant speed motor means, first clutch means for coupling said motor means to rotate said drive shaft at a fixed time rate per revolution, timing means operable to disengage said first clutch means upon completion of a predetermined number of revolutions, a driven shaft, a lever mounted on and rotated by said driven shaft, a first cam rotated by said drive shaft, means including a follower for said first cam and clutch means operated by said followers for coupling said driven shaft with said drive shaft to oscillate said lever once between a stop position therefor and said sextant arm for each revolution of said drive shaft, angle distance totalizer means including a pointer operated by said driven shaft to move over a scale so calibrated that said pointer in moving thereover will indicate for each oscillation of said lever actual angular movement of said lever divided by the number of oscillations thereof, a second cam rotated by said drive shaft, means including a second follower for said second cam and clutch means operated by said second follower for coupling said pointer to be rotated step by step with each oscillation of said lever, and means operable by said timing means for registering the time when one-half the predetermined number of revolutions of said drive shaft have been made.

PLINY G. HOLT.